(12) United States Patent
Kim (10) Patent No.: US 12,246,329 B2
(45) Date of Patent: Mar. 11, 2025

(54) WASTE OIL PURIFICATION APPARATUS (71) Applicant: TSKR Inc., Bucheon-si (KR)

(72) Inventor: In Sik Kim, Bucheon-si (KR)

(*) Notice: Subject to any disclaimer, the term of this patent is extended or adjusted under 35 U.S.C. 154(b) by 385 days.

(21) Appl. No.: 17/957,180

(22) Filed: Sep. 30, 2022

(65) Prior Publication Data

US 2023/0104542 A1 Apr. 6, 2023

(30) Foreign Application Priority Data

Oct. 6, 2021 (KR) .......................... 10-2021-0132205

(51) Int. Cl.
*B03C 1/30* (2006.01)
*B01D 29/05* (2006.01)
*B01D 29/56* (2006.01)
*B01D 29/60* (2006.01)
*B01D 35/00* (2006.01)
*B01D 35/157* (2006.01)
*B03C 1/28* (2006.01)

(52) U.S. Cl.
CPC ................ *B03C 1/30* (2013.01); *B01D 29/05* (2013.01); *B01D 29/56* (2013.01); *B01D 29/60* (2013.01); *B01D 35/005* (2013.01); *B01D 35/1573* (2013.01); *B03C 1/28* (2013.01); *B01D 2201/204* (2013.01); *B03C 2201/18* (2013.01)

(58) Field of Classification Search
CPC ......... B03C 1/30; B03C 1/28; B03C 2201/18; B03C 2201/22; B03C 1/286; B01D 29/05; B01D 29/56; B01D 29/60; B01D 35/005; B01D 35/1573; B01D 2201/204
See application file for complete search history.

(56) References Cited

FOREIGN PATENT DOCUMENTS

| JP | 2013-528484 A | 7/2013 |
| KR | 10-2009-0060856 A | 6/2009 |
| KR | 10-2012-0013483 A | 2/2012 |
| KR | 10-2012-0057218 A | 6/2012 |
| KR | 101465005 B1 * | 11/2014 |
| KR | 10-2016-0129572 A | 11/2016 |
| KR | 10-1997478 B1 | 7/2019 |

* cited by examiner

*Primary Examiner* — Waqaas Ali
(74) *Attorney, Agent, or Firm* — KORUS Patent, LLC; Seong Il Jeong (57) ABSTRACT

Disclosed herein is a waste oil purification apparatus that purifies waste lubricating oil and waste oil at high speed by a precipitation induction method in a vacuum state and further completely removes metallic foreign materials, thereby improving the efficiency of the purification of waste oil. The waste oil purification apparatus may include a purifier configured to purify waste oil such as waste lubricating oil or general waste oil by a filtering method, and a separator configured to separate and remove foreign materials contained in the waste oil purified by the purifier.

5 Claims, 6 Drawing Sheets

WASTE OIL PURIFICATION APPARATUS

CROSS-REFERENCE TO RELATED APPLICATION

This application claims the benefit of Korean Patent Application No. 10-2021-0132205 filed on Oct. 6, 2021, which is hereby incorporated by reference herein in its entirety.

BACKGROUND

1. Technical Field

The present invention relates generally to a waste oil purification apparatus, and more particularly to a waste oil purification apparatus that can additionally remove various metallic or non-metallic foreign materials completely via a purification process through vacuum and multi-stage filtering and a separation process of high-speed precipitation induction, thereby improving the efficiency of the purification of waste oil.

2. Description of the Related Art

In general, in various machine tools, hydraulic machines, automobile engines, general industries, etc., lubricating oils or oils having various viscosities and components are used to help the machining of products or to extend the service life of parts.

Conventional waste oil purification apparatuses for purifying waste oil, including waste lubricating oil and general waste oil, mostly remove foreign materials via centrifugal separators. However, it is considerably difficult to remove foreign materials with little specific gravity or metallic foreign materials by means of centrifugal force. If possible, it is necessary to use a motor with a very large horsepower (which requires high RPM). Therefore, the conventional waste oil purification apparatuses are problematic in that they are excessively expensive to be used in an actual industrial field and they are not practical in terms of treatment capacity.

PRIOR ART LITERATURE

Patent document 1: KR 10-0407159 B1

SUMMARY

The present invention has been conceived to overcome the above-described problems, and an object of the present invention is to provide a waste oil purification apparatus that can additionally remove various metallic or non-metallic foreign materials completely via a purification process through vacuum and multi-stage filtering and a separation process of high-speed precipitation induction, thereby improving the efficiency of the purification of waste oil.

Other objects and advantages of the present invention will be set forth below and will be apparent from the embodiments of the present invention. Furthermore, the objects and advantages of the present invention may be realized by the means and combinations set forth in the attached claims.

In order to accomplish the above object, the present invention provides a waste oil purification apparatus, including: a purifier configured to primarily purify waste oil via a purification method through vacuum and multi-stage filtering; and a separator configured to secondarily separate and remove foreign materials contained in the waste oil purified by the purifier;

wherein the purifier includes: a first inflow line and a second discharge line configured to introduce or discharge waste oil; a purification chamber configured such that the filtering of waste oil is performed while the waste oil is introduced and discharged by the vacuum suction of a suction pump; and a plurality of filter units disposed inside the purification chamber, and configured to remove foreign materials in passing waste oil;

wherein the separator includes: a second inflow line and a second discharge line configured to introduce or discharge waste oil; a separator chamber configured to secondarily separate waste oil and foreign materials; a waste oil discharge line disposed in the lower end portion of the separator chamber, and configured to discharge waste oil, transferred from the purifier, upward within the separator chamber; and a plurality of magnetic filter units disposed adjacent to the upper end of the waste oil discharge line, spaced apart from each other at regular intervals, and configured to remove metallic foreign materials in waste oil, discharged upward by the waste oil discharge line, by means of magnetic force;

wherein the purification chamber of the purifier includes: a pair of longitudinal partition walls formed in the longitudinal directions, and configured to separate filtering spaces and bypass spaces; a plurality of transverse partition walls disposed on the outsides of the longitudinal partition walls in the transverse directions, and configured to form partitions between the bypass spaces; and a plurality of installation guide portions disposed to allow each pair of installation guide portions to face each other at regular intervals on the insides of the longitudinal partition walls, and configured to guide the filter units through their installation; and wherein the separator further includes: a bubble generator configured to add micro-bubbles to waste oil pumped from the separator chamber by a pump; and a discharge pipe configured to discharge the waste oil, to which the micro-bubbles have been added, to the separator chamber, wherein the discharge pipe extends over the top portions of the magnetic filter units, and the discharge holes of the discharge pipe are formed downward to face the magnetic filter units.

Each of the bypass spaces may include: an inlet formed on the upper side of the bypass space, and configured such that waste oil bypassing one of the filter units flows into the bypass space therethrough; and an outlet formed on the lower side of the bypass space, and configured such that the waste oil bypassing the one filter unit flows out into a corresponding one of the filtering spaces therethrough.

Each of the filter units may include a frame configured to constitute the frame of the filter unit, a filter member configured to remove foreign materials, and fastening members configured to fasten the filter member to the frame; and the filter member may be made of any one of stainless steel, plastic, and reinforced plastic having corrosion resistance.

The filter member may have a hole size of 0.001 mm to 3 mm.

Inflows and discharges of waste oil from the first inflow line, second discharge line and first drain line of the purifier and the second inflow line, second discharge line and second drain line of the separator may be controlled by a plurality of control valves each of which selectively performs opening and closing under the control of a timer according to a precipitation rate and a foreign material removal situation.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

The details of other embodiments are included in the following detailed description and the accompanying drawings.

Advantages and features of the present invention and methods for achieving them will become apparent from embodiments that will be described in detail below with reference to the accompanying drawings. However, the present invention is not limited to the embodiments to be disclosed below, but may be implemented in various different forms. In the following description, when a part is described as being connected to another part, it includes not only a case where they are directly connected to each other but also a case where they are connected with another medium interposed therebetween. In addition, in the drawings, parts not related to the present invention are omitted to clarify the description of the present invention, and the same reference numerals are assigned to like parts throughout the specification.

The present invention will be described in detail below with reference to the accompanying drawings.

Figure 1:
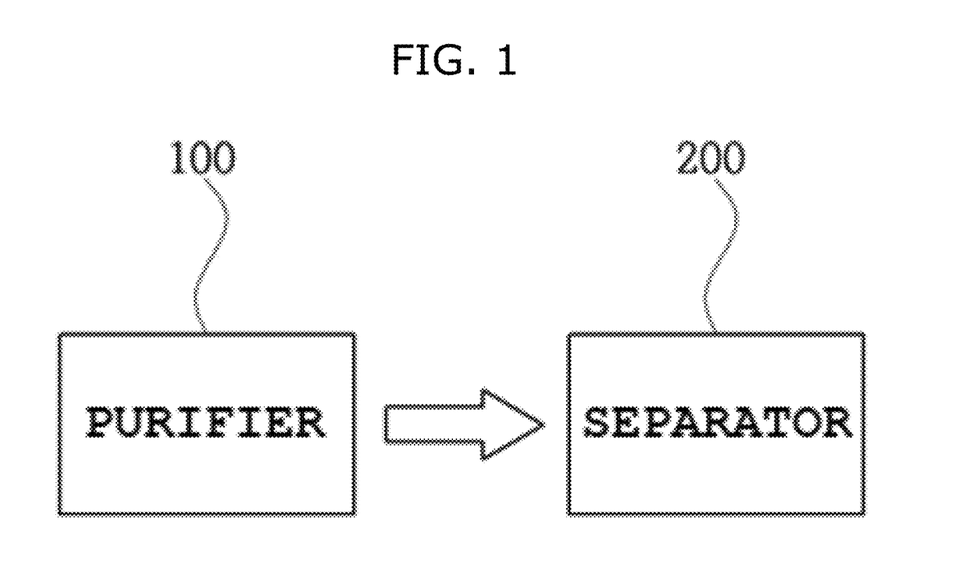
FIG. 1 is a diagram schematically showing the configuration of a waste oil purification apparatus according to the present invention.
Figure 2:
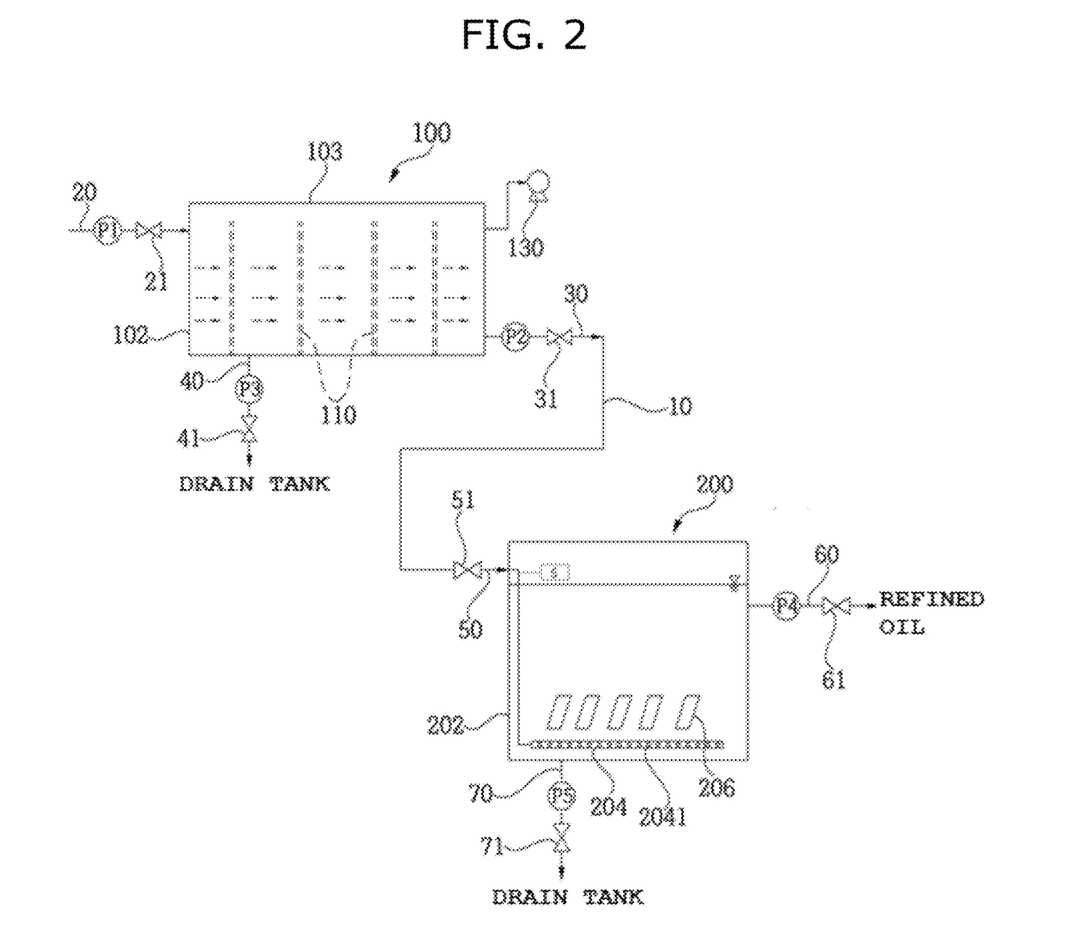
FIG. 2 is a diagram schematically showing the configurations of a purifier and a separator according to the present invention.
Figure 3:
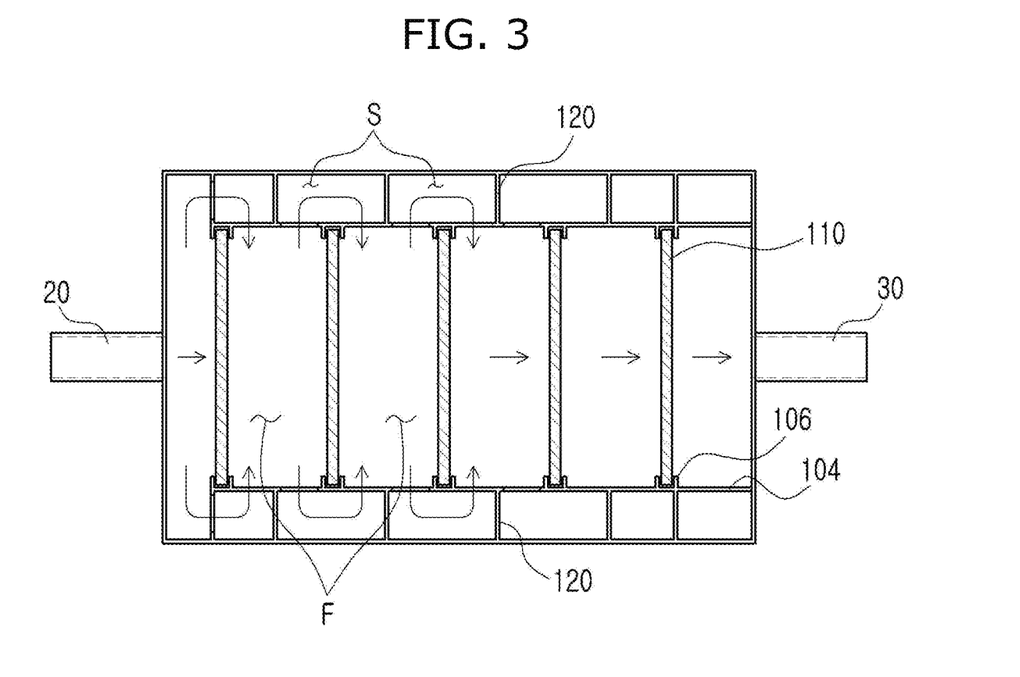
FIGS. 3 and 4 are views schematically showing the configuration of a purification chamber according to the present invention.
Figure 4:
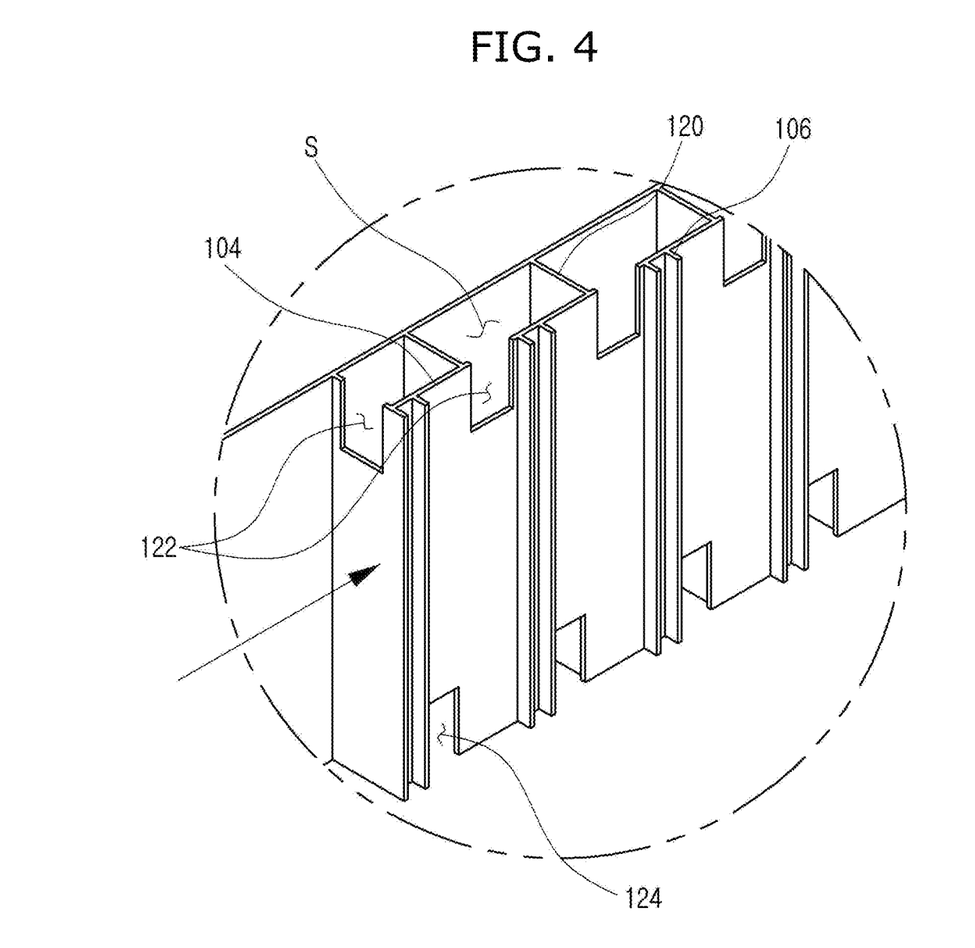
Figure 5:
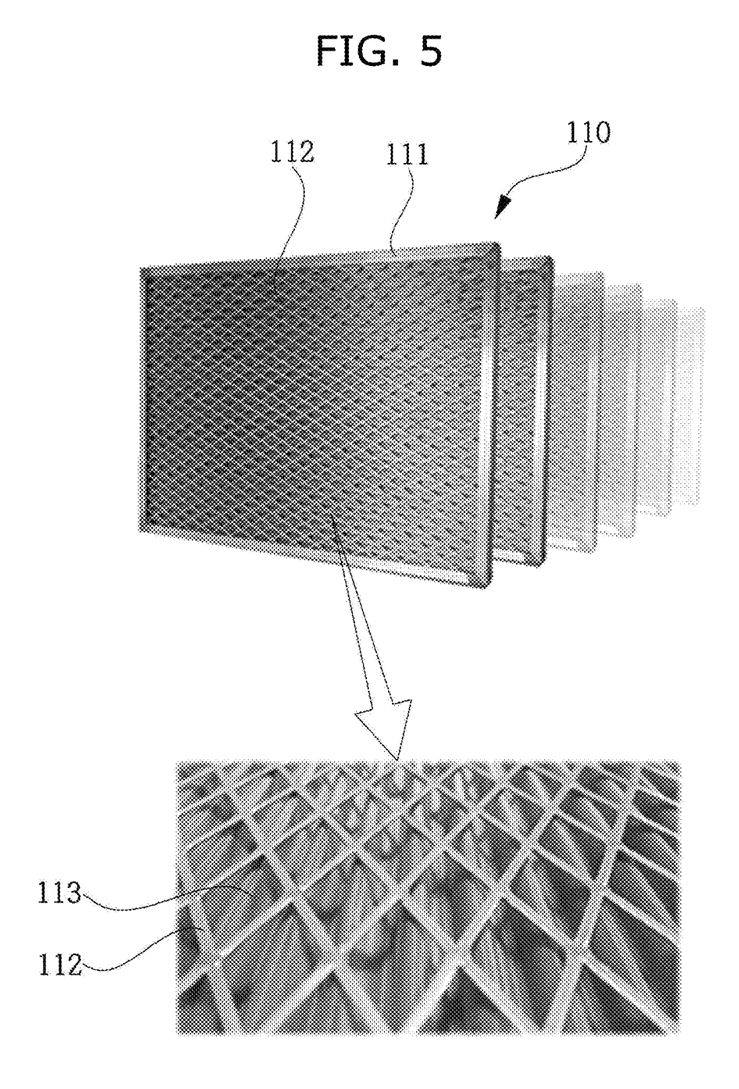
FIG. 5 is a view schematically showing the configuration of a filter unit according to the present invention.
Figure 6:
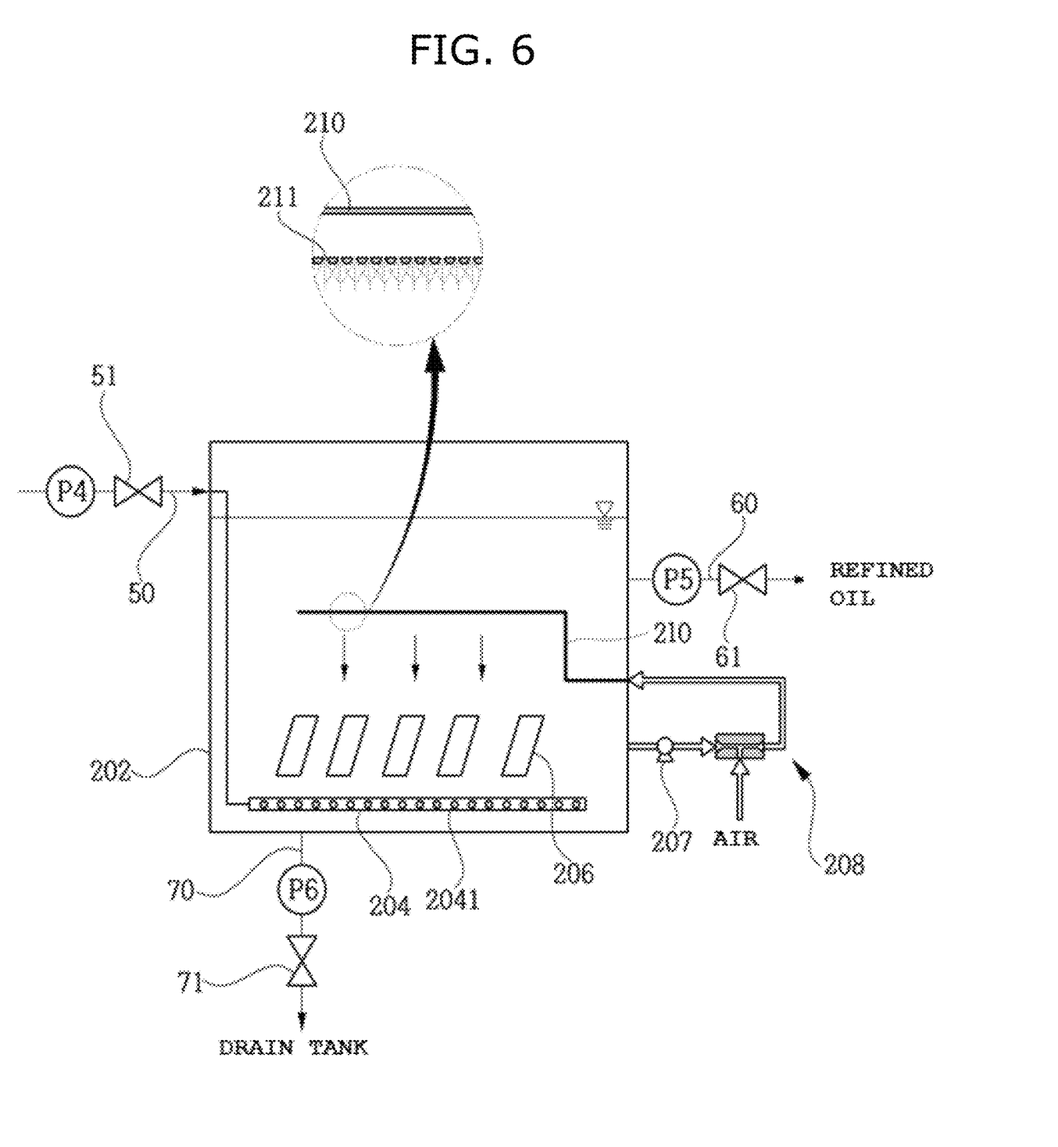
FIG. 6 is a diagram schematically showing the configuration of a separator according to another embodiment of the present invention.

FIG. 1 is a diagram schematically showing the configuration of a waste oil purification apparatus according to the present invention, FIG. 2 is a diagram schematically showing the configurations of a purifier and a separator according to the present invention, FIGS. 3 and 4 are views schematically showing the configuration of a purification chamber according to the present invention, FIG. 5 is a view schematically showing the configuration of a filter unit according to the present invention, and FIG. 6 is a diagram schematically showing the configuration of a separator according to another embodiment of the present invention.

Referring to FIG. 1, the waste oil purification apparatus according to the present invention may include a purifier 100 configured to primarily purify waste oil via a purification method through vacuum and multi-stage filtering, and a separator 200 configured to secondarily separate and remove foreign materials contained in the waste oil purified by the purifier 100.

In the installation of the purifier 100 and the separator 200, one or more separators 200 may be installed for one purifier 100 according to the environment of each industrial site. Conversely, one separator 200 may be installed for one or more purifiers 100.

Referring to FIG. 2, the purifier 100 may include: a first inflow line 20 and a second discharge line 30 configured to introduce or discharge waste oil; a purification chamber 102 configured such that the filtering of waste oil is performed while the waste oil is introduced and discharged by the vacuum suction of a suction pump 130; and a plurality of filter units 110 disposed inside the purification chamber 102, and configured to remove foreign materials in passing waste oil.

Furthermore, the purifier 100 may include a first drain line 40 configured to discharge unpurifiable waste oil to a first drain tank (not shown).

Although the purification chamber 102 is generally formed of a concrete storage facility in this embodiment, it is preferably formed of a steel structure or a synthetic resin tank in order to facilitate the provision of vacuum suction by the suction pump 130 in the present invention.

The suction pump 130 may be connected to the inside of the purification chamber 102, and may include a pressure pump configured to generate vacuum suction inside the purification chamber 102. A vacuum pump, an air pump, an air diaphragm pump, an air ejector, or the like may be applied as the pressure pump. For example, the degree of vacuum of the suction pump 130 may be −10 kPA or more.

By the vacuum suction generated by the suction pump 130, the waste oil in the purification chamber 102 is discharged to the outside while passing through the plurality of filter units 110, thereby functioning to efficiently remove foreign materials in the waste oil, especially foreign materials having little specific gravity.

A display unit (not shown) capable of displaying a control screen for controlling the suction pump 130 may be added. For example, a user interface in which operation and usage information such as the driving and stopping of the suction pump 130 and a set vacuum pressure are displayed in real time may be provided on the screen of the display unit.

A door 103 may be provided on the top surface of the purification chamber 102. The door 103 may be connected with a hydraulic cylinder (not shown) and selectively opened and closed.

When the door 103 is in an open state, an operator may be allowed to easily inspect and repair the purification chamber 102 (for the replacement of a filter unit, etc.).

When the door 103 is in a closed state, sealing may be achieved to maintain a negative pressure inside the purification chamber 102.

The separator 200 may include: a second inflow line 50 and a second discharge line 60 configured to introduce or discharge waste oil; a separator chamber 202 configured to secondarily separate waste oil and foreign materials; a waste oil discharge line 204 disposed in the lower end portion of the separator chamber 202, and configured to discharge the waste oil, transferred from the purifier 100, upward within the separator chamber 202; and a plurality of magnetic filter units 206 disposed adjacent to the upper end of the waste oil discharge line 204, spaced apart from each other at regular intervals, and configured to remove metallic foreign materials in the waste oil, discharged upward by the waste oil discharge line 204, by means of magnetic force. In this case, the discharge holes 2041 of the waste oil discharge line 204 may be formed upward to face the magnetic filter units 206.

The waste oil discharge line 204 is formed of a pipe that allows the waste oil, transferred from the purifier 100 to the separator 200, to be discharged to the lower end portion of the separator 200. The waste oil discharge line 204 is a part that assists in filtering out more foreign materials in the magnetic filter units 206 while the waste oil rises from the lower end portion of the separator 200 to the upper end portion thereof. During operation, the waste oil discharge line 204 functions to prevent the clean oil, already purified in the upper end portion, from being mixed with newly added unpurified waste lubrication oil.

In this case, the magnetic filter units 206 are disposed to be inclined in a specific direction (the leftward or rightward direction) and at an angle (35° to 55°, preferably 45°), and thus the contact of the magnetic filter units 206 with waste oil can be increased, thereby increasing purification efficiency.

The magnetic filter units 206 may use various types of units such as permanent magnets or electromagnets.

Furthermore, the separator 200 may include a second drain line 70 configured to discharge unpurifiable waste oil, including foreign materials separated from clean oil (refined oil), to a second drain tank (not shown).

The second discharge line 30 of the purifier 100 and the second inflow line 50 of the separator 200 may be connected to each other by using a predetermined connection pipe 10.

Preferably, inflows and discharges of waste oil from the first inflow line 20, second discharge line 30 and first drain line 40 of the purifier 100 and the second inflow line 50, second discharge line 60 and second drain line 70 of the separator 200 are controlled by a plurality of control valves 21, 31, and 41, and 51, 61, and 71 each of which selectively performs opening and closing under the control of a timer (not shown) (or a sensor) according to a precipitation rate and a foreign material removal situation.

In the purifier 100 of the present invention, the first inflow line 20 configured to introduce waste oil to be treated primarily includes a first pump P1 and the first control valve 21, the first discharge line 30 configured to discharge primarily treated waste oil includes a second pump P2 and the second control valve 31, and the first drain line 40 configured to discharge unpurifiable waste oil to the first drain tank (not shown) includes a third pump P3 and the third control valve 41.

In this case, each of the first control valve 21, the second control valve 31, and the third control valve 41 selectively opens and closes the first inflow line 20, the first discharge line 30, or the first drain line 40 for the purpose of inflow, discharge or drain of waste oil under the control of a timer (not shown).

In particular, the first pump P1, the second pump P2, and the third pump P3 are automatically operated in conjunction with the operation of the first control valve 21, the second control valve 31, or the third control valve 41 so that they start operation in the open position of the first control valve 21, the second control valve 31, or the third control valve 41 and stop operation in the closed position of the first control valve 21, the second control valve 31, or the third control valve 41. This means the simple on/off control of the pumps P1 to P3. This provides the advantage of not having to fine-tune the flow rate of each of the pumps P1 to P3 during operation and the advantage of applying simple low-cost pumps.

Preferably, the first control valve 21 (also referred to as a transfer control valve) of the first discharge line 30 configured to transfer waste oil to the separator 200 is connected to a timer, is automatically opened when a set time is reached, and then transfers the primarily purified waste oil, contained inside the purifier 100, to the separator 200. In this case, the pump P2 configured to transfer the waste oil of the purifier 100 to the separator 200 is also opened. The second inflow line 50 configured to introduce waste oil into the separator 200 is also connected to a timer, is automatically opened when a set time is reached, and transfers the waste oil, contained inside the purifier 100, to the separator 200.

The fluid control valve 30 is automatically turned off together with a pump (a pump configured to transfer waste oil from the purifier to the separator) after an appropriate amount of waste oil transferred to the separator has been sucked in via a sensor inside the separator.

The third control valve 41 (drain valve) of the first drain line 40 is connected to a timer, and automatically discharges the unpurifiable waste oil, contained inside the purifier 100, to the drain tank when a set time is reached.

Similarly, in the separator 200 of the present invention, the second inflow line 50 configured to introduce the waste oil to be treated secondarily includes the fourth control valve 51, the fifth discharge line 60 configured to discharge secondarily treated waste oil, i.e., clean oil (refined oil), includes a fourth pump P4 and the fifth control valve 61, and the second drain line 70 configured to discharge waste oil unpurifiable even with the secondary treatment to a second drain tank (not shown) includes a fifth pump P5 and the sixth control valve 71.

In this case, the fourth control valve 51, the fifth control valve 61, and the sixth control valve 71 selectively open and close the second inflow line 50, the second discharge line 60, and the second drain line 60 for the purpose of inflow, discharge, or drain of waste oil under the control of a timer (not shown).

In particular, the fourth pump P4 and the fifth pump P5 are automatically operated in conjunction with the operation of the fifth control valve 61 or the sixth control valve 71 so that they start operation in the open position of the fifth control valve 61 or the sixth control valve 71 and stop operation in the closed position of the fifth control valve 61 or the sixth control valve 71. This means the simple on/off control of the pumps P4 and P5. This provides the advantage of not having to fine-tune the flow rate of each of the pumps P4 and P5 during operation and the advantage of applying simple low-cost pumps.

Preferably, the fourth control valve 51 (also referred to as an inflow control valve) of the second inflow line 50 configured to introduce the waste oil to be treated secondarily is connected to a timer (not shown), and automatically transfers the waste oil, contained inside the purifier 100, to the separator 200 when a set time is reached.

The fifth control valve 61 (also referred to as a clean oil valve) of the fifth discharge line 60 configured to discharge secondarily treated waste oil, i.e., clean oil (refined oil), is connected to a timer, is automatically opened when a set time is reached, and transfers clean oil to a designated external storage tank. In this case, the fourth pump P4 (a clean oil transfer pump) of the fifth discharge line 60 is also opened.

The sixth control valve 71 (also referred to as a drain valve) of the second drain line 70 configured to discharge the waste oil unpurifiable even with the secondary treatment to the second drain tank (not shown) is connected to a timer, is automatically opened when a set time is reached, and discharges complete waste oil (unpurifiable waste oil, such as foreign materials separated from clean oil), contained inside the separator 200, to a drain tank (not shown).

Preferably, the fifth discharge line 60 configured to discharge secondarily treated waste oil, i.e., clean oil (refined oil), may include one or more lines, in which case the oil purified as desired according to the purification rate of clean oil (80%, 90%, 99%, or the like) may be also separated.

A flow sensor S formed at the inlet of the separator 200 and configured to detect the inflow of waste oil is located at the rear end of the second inflow line 50 configured to introduce the waste oil to be treated secondarily. The flow sensor S may be formed of a water level control sensor or a level switch. The flow sensor S may allow a set amount of waste oil to be transferred when waste oil is transferred from the purifier 100 to the separator 200.

Referring to FIG. 3, the purification chamber 102 of the purifier 100 may include: a pair of longitudinal partition walls 104 formed in the longitudinal directions, and configured to separate filtering spaces F and bypass spaces S; a plurality of transverse partition walls 120 disposed on the outsides of the longitudinal partition walls 104 in the transverse directions, and configured to form partitions between the bypass spaces S; and a plurality of installation guide portions 106 disposed to allow each pair of installation guide portions to face each other at regular intervals on the insides of the longitudinal partition walls 104, and configured to guide the filter units 110 through their installation.

Referring to FIG. 4, each of the bypass spaces S may include: an inlet 122 formed on the upper side of the bypass space S, and configured such that the waste oil bypassing one of the filter units 110 flows into the bypass space S therethrough; and an outlet 124 formed on the lower side of the bypass space S, and configured such that the waste oil bypassing the one filter unit 110 flows out into a corresponding one of the filtering spaces F therethrough. Although in this case, the inlet 122 is formed on the upper side and the outlet 124 is formed on the lower side, it is obvious that they can be formed on the opposite sides if necessary.

In this case, the inlet 122 is mainly formed in the longitudinal partition wall 104. However, a case may occur where the first filter unit 110 located first is blocked. In preparation for this case, the inlet 122 may be exceptionally formed on the upper side of the transverse partition wall 120 located first.

Referring to FIG. 5, each of the filter units 110 may include: a frame 111 configured to constitute the frame of the filter unit 110; a filter member 113 configured to remove foreign materials; and fastening members 112 configured to fasten the filter member 113 to the frame 111. In this case, the filter member 113 is made of a stainless steel material, plastic (PC, PE, PP, PVC, ABS, or the like), or reinforced plastic (glass fiber reinforced plastic, carbon fiber reinforced plastic, engineering plastics-polyamide, polyacetal, polycarbonate, polybutylene terephthalate, or modified polyphenylene oxide) having corrosion resistance.

Preferably, the filter member 113 may have a hole size of 0.001 mm to 3 mm.

In this case, the fastening members 112 may be formed in a planar shape and configured to support and fasten the top and bottom surfaces of the filter member 113, respectively. In addition, one of various shapes (e.g., a circle, a rhombus, a square, etc.) may be applied to the fastening members 112 to perform an additional filtering role according to the nature of sucked waste oil. When necessary, different hole sizes may be applied to the fastening members 112.

The stainless steel material is non-ferrous, and may be stainless steel. The stainless steel material has the advantage of strong corrosion resistance because it does not easily rust.

Referring to FIG. 6, a separator 200 according to another embodiment further includes: a bubble generator 208 configured to add micro-bubbles to the waste oil pumped from the separator chamber 202 by a pump 207; and a discharge pipe 210 configured to discharge the waste oil, to which the micro-bubbles have been added, to the separator chamber 202. In this case, the discharge pipe 210 may extend over the tops of the magnetic filter units 206.

In addition, the discharge holes 211 of the discharge pipe 210 may be formed downward to face the magnetic filter units 206, and the discharge holes 211 may be formed to have a diameter that increases downward. For example, the longitudinal section of the discharge holes 211 may be formed in a trapezoidal shape having a large lower diameter. Through this, the water pressure of the micro-bubbles discharged through the discharge holes 211 is relieved and thus the micro-bubbles are discharged slowly, thereby extending the time for the waste oil to stay in the upper portions of the magnetic filter units 206 and thus assisting in facilitating the removal of metallic foreign materials.

As described above, according to the waste oil purification apparatus using a high-speed precipitation induction method according to the present invention, fine foreign materials (various metallic or non-metallic foreign materials) contained in viscous waste oil can be effectively removed via the purification process through vacuum and multi-stage filtering and the separation process of high-speed precipitation induction, so that anyone can easily use the apparatus by maximizing purification efficiency at a low cost, thereby remarkably reducing the generation of waste oil and also expecting ancillary effects such as the prevention of carbon emission and an increase in operation efficiency.

It will be understood by those of ordinary skill in the art to which the present invention pertains that the present invention may be embodied in other specific forms without changing the technical spirit or essential features of the present invention. Therefore, it should be understood that the embodiments described above are illustrative and not restrictive in all respects. The scope of the present invention is defined by the attached claims rather than the above detailed description. All changes or modifications derived from the meanings and scope of the claims and their equivalents should be construed as being included in the scope of the present invention.

What is claimed is:
1. A waste oil purification apparatus, comprising:
   a purifier configured to primarily purify waste oil via a purification method through vacuum and multi-stage filtering; and
   a separator configured to secondarily separate and remove foreign materials contained in the waste oil purified by the purifier;
   wherein the purifier comprises:
      a first inflow line and a second discharge line configured to introduce or discharge waste oil;
      a purification chamber configured such that filtering of waste oil is performed while the waste oil is introduced and discharged by vacuum suction of a suction pump; and
      a plurality of filter units disposed inside the purification chamber, and configured to remove foreign materials in passing waste oil;
   wherein the separator comprises:
      a second inflow line and a second discharge line configured to introduce or discharge waste oil;
      a separator chamber configured to secondarily separate waste oil and foreign materials;
      a waste oil discharge line disposed in a lower end portion of the separator chamber, and configured to discharge waste oil, transferred from the purifier, upward within the separator chamber; and a plurality of magnetic filter units disposed adjacent to an upper end of the waste oil discharge line, spaced apart from each other at regular intervals, and configured to remove metallic foreign materials in waste oil, discharged upward by the waste oil discharge line, by means of magnetic force;

wherein the purification chamber of the purifier comprises:

a pair of longitudinal partition walls formed in longitudinal directions, and configured to separate filtering spaces and bypass spaces;

a plurality of transverse partition walls disposed on outsides of the longitudinal partition walls in transverse directions, and configured to form partitions between the bypass spaces; and a plurality of installation guide portions disposed to allow each pair of installation guide portions to face each other at regular intervals on insides of the longitudinal partition walls, and configured to guide the filter units through their installation; and wherein the separator further comprises:

a bubble generator configured to add micro-bubbles to waste oil pumped from the separator chamber by a pump; and a discharge pipe configured to discharge the waste oil, to which the micro-bubbles have been added, to the separator chamber, wherein the discharge pipe extends over top portions of the magnetic filter units, and discharge holes of the discharge pipe are formed downward to face the magnetic filter units.

2. The waste oil purification apparatus of claim 1, wherein each of the bypass spaces comprises:

an inlet formed on an upper side of the bypass space, and configured such that waste oil bypassing one of the filter units flows into the bypass space therethrough; and an outlet formed on a lower side of the bypass space, and configured such that the waste oil bypassing the one filter unit flows out into a corresponding one of the filtering spaces therethrough.

3. The waste oil purification apparatus of claim 1, wherein:

each of the filter units comprises:

a frame configured to constitute a frame of the filter unit;

a filter member configured to remove foreign materials; and fastening members configured to fasten the filter member to the frame; and the filter member is made of any one of stainless steel, plastic, and reinforced plastic having corrosion resistance.

4. The waste oil purification apparatus of claim 3, wherein the filter member has a hole size of 0.001 mm to 3 mm.

5. The waste oil purification apparatus of claim 1, wherein inflows and discharges of waste oil from the first inflow line, second discharge line and first drain line of the purifier and the second inflow line, second discharge line and second drain line of the separator are controlled by a plurality of control valves each of which selectively performs opening and closing under the control of a timer according to a precipitation rate and a foreign material removal situation.

* * * * *